US008472987B2

(12) United States Patent
Bhatnagar (10) Patent No.: US 8,472,987 B2
(45) Date of Patent: Jun. 25, 2013

(54) SHORT MESSAGE SERVICE (SMS) MESSAGE INTEGRATION WITH CUSTOMER RELATIONSHIP MANAGEMENT (CRM) APPLICATIONS (76) Inventor: Aneesh Bhatnagar, Karnataka (IN)

( * ) Notice: Subject to any disclaimer, the term of this patent is extended or adjusted under 35 U.S.C. 154(b) by 132 days.

(21) Appl. No.: 13/002,463

(22) PCT Filed: May 18, 2009

(86) PCT No.: PCT/IB2009/052062
§ 371 (c)(1),
(2), (4) Date: Mar. 31, 2011

(87) PCT Pub. No.: WO2010/001276
PCT Pub. Date: Jan. 7, 2010

(65) Prior Publication Data
US 2011/0223945 A1    Sep. 15, 2011

(30) Foreign Application Priority Data
Jul. 1, 2008 (IN) ............................ 1599/CHE/2008

(51) Int. Cl.
*H04W 4/00* (2009.01)
(52) U.S. Cl.
USPC ............................ 455/466; 455/517; 709/236
(58) Field of Classification Search
None
See application file for complete search history.

(56) References Cited

U.S. PATENT DOCUMENTS

| 2003/0109271 A1* | 6/2003 | Lewis et al. | 455/517 |
| 2005/0090272 A1* | 4/2005 | Anson et al. | 455/466 |
| 2006/0161646 A1* | 7/2006 | Chene et al. | 709/223 |
| 2007/0223444 A1* | 9/2007 | Foo et al. | 370/349 |
| 2008/0014971 A1* | 1/2008 | Morin et al. | 455/466 |
| 2008/0096507 A1* | 4/2008 | Erola | 455/187.1 |
| 2008/0140857 A1* | 6/2008 | Conner et al. | 709/236 |

FOREIGN PATENT DOCUMENTS
WO   WO 2004012109 A1 * 2/2004

* cited by examiner

*Primary Examiner* — Erika A Washington
(74) *Attorney, Agent, or Firm* — Steven M. Greenberg; Carey Rodriguez Greenberg O'Keefe, LLP (57) ABSTRACT

A method and system to transmit SMS message to an SMS Gateway (belonging to selected Service Provider) selected from a list on the GUI component of the CRM application, depending upon the geographical location of the Customer is disclosed. The GUI component provides a list of configured Service Providers that may be selected before sending outbound SMS message to a recipient. A unique Service Provider identifier is assigned to each of the configured Service Provider belonging to Customer's network/country. Depending upon the geographical location of the Customer, the Service Provider is selected from the list on the GUI component and the SMS message is transmitted to the customer wherein the method identifies the SMS Gateway to which it has to connect, and transmits the SMS message. The method internally fetches the details of SMS Gateway based on Service Provider ID and uses it to communicate with the appropriate SMS Gateway.

8 Claims, 8 Drawing Sheets

SHORT MESSAGE SERVICE (SMS) MESSAGE INTEGRATION WITH CUSTOMER RELATIONSHIP MANAGEMENT (CRM) APPLICATIONS

CROSS-REFERENCE TO RELATED APPLICATIONS

This application is a §371 national stage entry of International Application No. PCT/IB2009/052062, filed May 18, 2009, which claims priority to Indian Patent Application No. 1599/CHE/2008, filed Jul. 1, 2008.

TECHNICAL FIELD

The invention relates to a method and system to transmit SMS message to an SMS Gateway (belonging to selected Service Provider) selected from a list on the GUI component, depending upon the geographical location of the Customer.

BACKGROUND ART

Customer Relationship Management is a term applied to the processes implemented by a company to handle its interaction with its customers. CRM software is used to support these processes in addition to storing information on current and prospective customers. Information in the system can be accessed and entered by employees in different departments, such as sales, marketing, customer service, training, professional development, performance management, human resource development, compensation and others. Details on any customer contacts can also be stored in the system. The rationale behind this approach is to improve services provided directly to the customers and to use the information in the system for targeted marketing and sales. CRM software reduces operating costs and helps all customer-facing personnel of the company make better and timely decisions. Companies or organizations in almost every industry try to use customer information to manage relationships. Customer Relationship Management is a term applied to the processes implemented by a company to handle its interaction with its customers. CRM software is used to support these processes in addition to storing information on current and prospective customers. Information in the system can be accessed and entered by employees in different departments, such as sales, marketing, customer service, training, professional development, performance management, human resource development, compensation and others. Details on any customer contacts can also be stored in the system. The rationale behind this approach is to improve services provided directly to the customers and to use the information in the system for targeted marketing and sales. CRM software reduces operating costs and helps all customer-facing personnel of the company make better and timely decisions. Companies or organizations in almost every industry try to use customer information to manage relationships.

DISCLOSURE OF INVENTION

Technical Problem

Most of the CRM applications available today support transmission of SMS messages that are configured to a single SMSGateway or Service Provider and do not provide an option to change or choose the SMS Gateway from the CRM application's GUI before sending out the SMS message to the customers and prospects. With the present technologies available today, the only way this purpose can be achieved is through back end configuration or selection of the SMS Gateway while installing or deploying the system.

However, based on some constraints like geographical location of the Customer, the ability to choose a country specific SMS Gateway, depending upon customer's network/country, is a critical requirement because when an SMS message is sent to a different country using a Short Code, choosing a local SMS Gateway will reduce the cost per SMS to a great extent as compared to an SMS message sent through an international SMS Gateway. An SMS message transmitted through an international SMS Gateway that can deliver to multiple countries involves a higher cost per SMS message since it will be treated as an international SMS message. Similarly, when a Customer (commonly known as a contact in a CRM application) responds to the organization/institution using the Short Code or Long Code via a local SMS Gateway, the cost of the SMS message to the Customer will be much lower as compared to an SMS transmitted via an international SMS Gateway. Thus what is needed is a system and method that may provide an option to choose a SMS Service Provider (depending upon the geographical location of the recipient Customer) from a list before sending out the SMS Message.

Technical Solution

The invention meets the above needs and overcomes one or more deficiencies in the prior art by providing an option to the CRM user to select the SMS Service Provider from a list on the CRM User Interface, depending upon the geographical location of the Customer. More specifically, in one embodiment, the invention provides a method to transmit SMS message to an SMS Service Provider selected from a list on the GUI component, depending upon the geographical location of the Customer.

According to one aspect of the invention, a method to transmit SMS message to the SMS Gateway (belonging to selected Service Provider), depending upon the geographical location of the Customer includes selecting SMS Service provider from a list on the GUI component of the CRM application, converting SMS message to XML format, retrieving web service details from the application configuration file stored in the application database, identifying the service provider configured to the web service, retrieving the service provider details from the configuration file stored in the application database, checking priority of the outbound SMS message, retrieving SMS message based on priority by calling different predefined methods for each priority, loading service provider specific XML structure that defines rules accepted by the service provider, converting the SMS message to the service provider specific XML format by using XSLT transformations, transmitting XML format of the SMS message to the service provider, fetching time stamped status report from the service provider, updating the application database with latest status report.

According to another aspect of the invention a system is provided for transmitting SMS message to the Service Provider selected from a list on the GUI component in a CRM application, depending upon the geographical location of the Customer. The system includes at least one computing device running a CRM application; at least one messaging device; a web service; an application server; at least one SMS service provider supported by the CRM application; an SMSC (Short Service Messaging Center) for storing, sending and receiving SMS messages to and from the messaging device; the computing device being connected to the interne and being configured to send and receive SMS messages through CRM application running on the computing device; the application server further comprising a computer having a machine readable storage, having stored thereon one or more computer programs comprising a plurality of code sections executable by a machine for maintaining a plurality of identification and authentication information about the configured SMS service providers in application database, for routing SMS messages to the identified SMS service provider; the application server being configured to transmit SMS message from the CRM application to the SMS service provider; the messaging device comprising a messaging device registered to the SMS service provider whereby an SMS message transmitted by the user through the computing device, may be sent to the SMS service provider, and the SMS service provider may forward the SMS message to the messaging device through SMS service provider; the service provider receives SMS messages from the computing device and further transmits SMS message to the SMSC; the web service being configured to the service provider.

Advantageous Effects

The invented method disclosed herein, provides the flexibility to configure multiple SMS Gateways and Service providers in a CRM application, so that while sending an SMS message, a user may choose the SMS Gateway or Service Provider based on the Customer's geographical location. This results in cost reduction to the organization, as well as the Customers who receive and respond to the SMS message via same SMS Gateway that belongs to their own network/country. A CRM user may select an appropriate SMS Gateway for Campaigns as well as for normal communication with the Customer, based on the Customer's geographical location. Choosing an SMS Gateway which is regional or country specific will not consider SMS messages sent as international, and will be charged at local rates that helps in reducing the cost of bulk SMS message to Customers spread across various geographic locations of the world. As most of the organizations/institutions have various offices across the globe and cater to global customers, it is very critical to help organizations using a software application, including a CRM application, reach and interact with its Customers through SMS, irrespective of their location, at the lowest rate. The present invention helps bring in better Return On Investment (ROI) on communication and Campaigns.

The methods and systems disclosed herein may be implemented in any means for achieving various aspects and may be executed in the form of a machine readable medium embodying a set of instructions that when executed by a machine, cause the machine to perform any of the operations disclosed herein. Other features will be apparent from the accompanying drawings and from the detailed description that follows.

DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

BEST MODE

In the following description of various embodiments, reference is made to the accompanying drawings which form a part hereof, and in which is shown by way of illustration various embodiments of practicing the present invention. While the invention has been particularly shown and described with reference to an illustrative embodiment, it will be understood by those skilled in the art that various changes in the form and detail may be made therein without departing from the spirit and soul of the invention.

The present invention is directed to a system, method and a computer program product to send SMS messages to multiple SMS Gateways in a CRM application, depending upon the geographical location of the customer. The invented method enables a CRM user to send outbound SMS messages to the contacts by selecting a Service Provider from a pull down menu provided on the GUI of the application. SMS messages may be sent to contacts about requests made to company/organization, or to promote organization's product/services.

Figure 2:
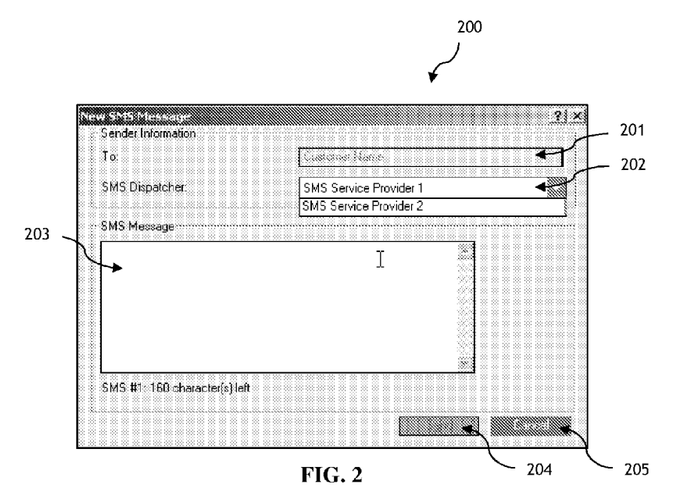
FIG. 2 is an exemplary GUI component with a pull down menu, providing a list of available Service Providers, while transmitting an SMS from a CRM application.
Figure 3:
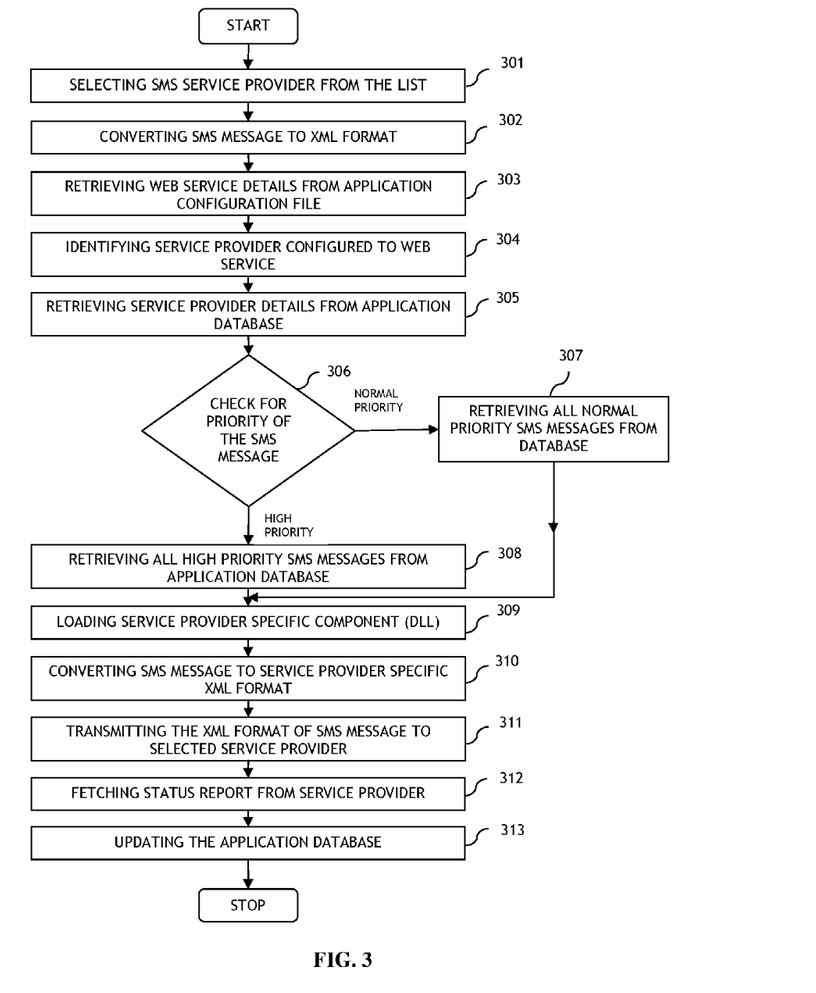
FIG. 3 is an exemplary process flow illustrating one approach of processing SMS message, in response to selecting a Service Provider from the list, in accordance with one embodiment of the present invention.

In one embodiment of the present invention, a method (i.e. the method as described in FIG. 3) to transmit SMS message to a service provider selected from a list on the GUI component of a CRM application includes steps of selecting SMS Service provider from a list on the GUI component (200, FIG. 2) of the CRM application, converting SMS message to XML format (302 of FIG. 3), retrieving web service details from the application configuration file stored in the application database (303 of FIG. 3), identifying the service provider configured to the web service (303 of FIG. 3), retrieving the service provider details from the configuration file stored in the application database (304 of FIG. 3), checking priority of the outbound SMS message (305 of FIG. 3), retrieving SMS message based on priority by calling different predefined methods for each priority (306, 307 of FIG. 3), loading service provider specific XML structure that defines rules accepted by the service provider (308 of FIG. 3), converting the SMS message to the service provider specific XML format by using XSLT transformations (309 of FIG. 3), transmitting XML format of the SMS message to the service provider (311 of FIG. 3), fetching time stamped status report from the service provider (312 of FIG. 3), updating the application database with latest status report (313 of FIG. 3).

In another embodiment of the invention a system 100 (FIG. 1) is provided for transmitting SMS message to the Service Provider 105 selected from a list on the GUI component in a CRM application, depending upon the geographical location of the recipient Customer. The system 100 includes at least one computing device 101 running a CRM application; at least one messaging device 107; a web service 103; an application server 102; at least one SMS service provider 105 supported by the CRM application; an SMSC (Short Service Messaging Center) 106 for storing, sending and receiving SMS messages to and from the messaging device 107; the computing device 101 being connected to the internet and being configured to send and receive SMS messages through CRM application running on the computing device 101; the application server 102 further comprising a computer having a machine readable storage, having stored there on one or more computer programs comprising a plurality of code sections executable by a machine for maintaining a plurality of identification and authentication information about the configured SMS service providers 105 in application database 102, for routing SMS messages to the identified SMS service provider 105; the application server 102 being configured to transmit SMS message from the CRM application to the SMS service provider 105; the messaging device 107 comprising a messaging device 107 registered to the SMS service provider 105 whereby an SMS message transmitted by the user through the computing device 101, may be sent to the SMS service provider 105 and the SMS service provider 105 may forward the SMS message to the messaging device 107 through SMS service provider 105; the service provider 105 receives SMS messages from the computing device 101 and further transmits SMS message to the SMSC 106; the web service 103 being configured to the service provider.

The method disclosed herein addresses some web technologies that include some major technologies described in more details below.

A Web Service is a software application that describes a standardized way of integrating web-based applications using the eXtensible Markup Language (XML), Simple Object Access Protocol (SOAP), Web Services Description Language (WSDL) and Universal Description, Discovery and Integration (UDDI) open standards over an Internet protocol backbone. Web services are accessed via ubiquitous web protocols and data formats, such as Hypertext Transfer Protocol (HTTP) and XML. Thus, at present, the basic Web Service platform is XML plus HTTP. XML is a text-based markup language that is currently used extensively for data interchange on the Web. As with HTML, data is identified using tags, which are collectively known as 'markup'. XML tags identify the data, and act as a field name in the program. XML is a language that allows complex interactions between clients and services, as well as between components of a composite service, to be expressed. HTTP is an application protocol, and more particularly is a set of rules for exchanging files (text, graphic images, sound, video, and other multimedia files) on a network such as the World Wide Web. While the examples set forth herein are generally described in connection with XML and HTTP, it should be recognized that this is for illustrative purposes, and current and future types of protocols and data formats may also be employed. SOAP is a lightweight XML-based messaging protocol specification that defines a uniform manner of passing XML-encoded data and is mainly used to transfer the data as well as defines a manner to perform RPCs (a remote procedure call, a type of protocol that allows a program on one computer to execute a program on a server computer) using HTTP as the underlying communication protocol. SOAP messages are independent of any operating system or protocol and may be transported using a variety of Internet protocols. WSDL is an XML-formatted language used to describe a Web service's capabilities as collections of communication endpoints capable of exchanging messages. WSDL is an integral part of UDDI, an XML-based worldwide business registry. WSDL is the language that UDDI uses. UDDI is a Web-based distributed directory that enables businesses to list themselves on the Internet and discover each other, similar to a traditional phone book's yellow and white pages. Used primarily as a means for businesses to communicate with each other and with the clients. Web Services allow organizations to communicate data without intimate knowledge of each other's information systems behind the firewall. Unlike traditional client/server models, such as a Web server/Web page system, Web Services do not provide the user with a GUI but instead share business logic, data and processes through a programmatic interface across a network. Developers can then add the Web service to a GUI (such as a Web page or an executable program) to offer specific functionality to users. One of the main features of the Web services is that it allows different applications from different sources to communicate with each other without time-consuming custom coding, and because all communication is in XML, Web services are not tied to any one operating system or programming language. For example, Java can talk with Perl; Windows applications can talk with UNIX applications.

An SMS Service Provider is a business entity that provides SMS messaging services between two wireless communication channels. It works as a gateway between the cellular network and an organization intranet or SMS messaging service users e.g. a cellular telephone user. An SMS Service Provider usually signs agreements with a lot of mobile network operators to obtain their permission to exchange SMS messages with their cellular networks and offers an interface for users to send and receive SMS messages. SMS Service Providers are also known as SMS Gateway Providers. An SMS Service Provider provides an SMS Gateway for its users to forward simple SMS messages to a cellular phone recipient and vice versa. This SMS Gateway routes the SMS messages to another SMS Gateway that may further transmits the SMS message to the Short Message Service Center (SMSC). SMS Gateways are proxies between the SMSC and Service Providers which transform the complex telecommunications protocol interfaces to more simple interfaces used by the content providers. The SMS Gateway is based on web server architecture, exposing its functionality as Web Services and issuing Web Service calls to notify client applications. The implementation is standalone and provides its own Web server without requiring integration within other web servers. Protocols/interfaces commonly supported by SMS gateway providers for sending and receiving SMS messages may include HTTP, HTTPS, XML over HTTP or HTTPS, SMTP (email to SMS/SMS to email), FTP (for sending bulk SMS messages) and SMPP (Short Message Peer to Peer). The SMPP protocol is a telecommunications industry protocol for exchanging SMS messages between SMS peer entities such as SMSC. It is often used to allow third parties (e.g. value-added service providers like news organizations) to submit messages, often in bulk. An SMS Gateway provides a communication path between fixed protocol type, e.g. between HTTP protocol messages and SMPP protocol messages. Separate gateway Application Programming Interface (APIs) may be developed to communicate with other protocol types. An API is a set of routines, data structures, object classes and/or protocols provided by libraries and/or operating system services in order to support the building of applications. In general, APIs may be used to facilitate development of the methods which may be used to accomplish the function described herein such as for each service provider configured to the CRM application, a new API may be developed.

Most of the SMS Gateway providers also provide a web-based account management system. Some account management systems are accessible via HTTPS. With an HTTPS connection, the data transmitted between a computer and the web server over the interne is encrypted. Some account management systems provide detailed reports of the SMS messages sent and received. Reports of a certain day or date range may be provided by them on request. The reports usually include fields such as the total number of SMS message sent or received, the date and time at which an individual SMS message was sent or received, and the originating/recipient cellular phone number.

If the users of several network operators are to be served, the Service Providers have to connect their services to various SMSCs in many countries, and even have to connect to many SMSCs in one country. As the number of supported SMS centers increases, one SMS Gateway cannot handle all the SMSCs. There have to be several SMS Gateways distributed throughout the world. These SMS Gateways need to interact if global services are to be developed. For some time now, these transactions have been carried out using HTTP, but since each Service Provider creates its own standards for implementation, leading to interoperability problems. These problems are solved by using either SMAP (Short Message Application Part) or MMAP (Mobile Message Access Protocol) wherein SMAP is an XML format for the messages themselves and MMAP is a SOAP-based protocol for sending those messages. MMAP provides a standard XML-based framework for mobile messaging over SOAP and HTTP. It provides a mechanism whereby applications can initiate 'one-shot' requests or more complex peer sessions over SOAP and HTTP. SMAP is an application part of MMAP, providing a transport-independent set of XML primitives for handling Short Messages. SMAP provides XML operations for: (1) Submission of short messages to a Short Message Service Centre; (2) delivery of short messages and delivery receipts to an application; (3) management of messages after submission. When compared to the binary form that SMS messages generally take, this XML-based format is more interoperable in the short-term and easier to convert to other formats later on, if necessary. XML technology has been widely used to encode, store and transfer various types of data including SMS messages over the internet and the corresponding Document Type Definition (DTD) for the message structure is described for such codes. In addition, the companion XSLT (eXtensible Style sheet Transformations) specification provides template-based transformation mechanism on XML documents. SMS Gateways are responsible for extracting information from the SMS messages and presenting it to the devices. Different Service Providers may require different types of XSLT templates or transforming rules to meet the specific presentation capacities. Thus, XSLT is used for transforming one XML format into another XML format. Whenever a message is sent from the CRM application, it is first converted into XML format. This XML format of the SMS message is further converted into the another XML format by using XSLT template provided by the SMS Service Provider and similarly each SMS message received from the Service provider is first converted into XML format as specified and understood by the CRM Application.

Short Message Service (SMS) is the term used for short messages (typically less than 160 characters) that are sent between cellular phones, or other applications. SMS messaging has been gaining popularity because of its low cost and quick message transfer. In addition to messaging between cellular phones, SMS facility can be incorporated into CRM applications for various purposes. SMS messages are generally exchanged between two terminals via SMSC. The SMSC is a software that resides in the operator's networks and manages the processes including queuing the messages, billing the sender and retrieving receipts etc. SMSC is responsible for handling the SMS operations of a wireless network. Whenever an SMS message is sent from a cellular phone, it reaches the SMSC first that further forwards it to the SMS Gateway configured with the cellular network. An SMS message may need to pass through more than one network entity (e.g. SMSC and SMS Gateway) before reaching the destination. The main duty of an SMSC is to route SMS messages and regulate the process. If the recipient is unavailable (for example when the mobile phone is switched off) the SMSC will store the SMS message. It will forward the SMS message when the recipient is available. Generally, Short Codes are widely used for value-added services via SMS messaging, such as television voting, ordering ringtones, marketing campaigns, notifications, alerts and other mobile services. Short Codes make it easy for consumers to respond to and engage with an advertising and marketing program. Short Code, also known as short numbers, are special telephone numbers, significantly shorter than full telephone numbers (also known as Long Code), which can also be used to address SMS and MMS messages from cellular phones or fixed phones. They are designed to be shorter to read out and easier to remember than normal telephone numbers. While similar to telephone numbers, they are, at the technological level, unique to each Service Provider. Generally, messages sent to Short Code can be billed at a higher rate than a standard SMS message. An SMS message sent to an international Short Code via various SMS Gateways may cost even more to a Customer. When using a shared Short Code, a number of Customers share the same Short Code, with their messages identified by their unique keyword. A keyword is a unique term (letters and or numbers), that a customer may text to a shared Short Code. When a Customer sends out reply SMS message using Short Code, the SMS message is delivered to the CRM application by the SMS Service Provider. A keyword may be any of the universal commands such as STOP, QUIT, END, CANCEL, UNSUBSCRIBE, STOP ALL, and HELP or may be any specific command such as ACC BAL for account balance, ADD INFO for seeking admission information and so on that may vary from application to application. Depending upon the keyword the SMS message may be forwarded to the relevant department within the organization/institution.

The aforementioned, and other, technologies, protocols, data formats, etc. may be used in employing Web services. However, these known technologies are referenced in order to provide exemplary technologies currently available in the development and use of Web services. The invention thus may utilize these known technologies, but is also applicable to other existing and/or future technologies, as will be readily apparent to those skilled in the art from an understanding of the description provided herein.

Figure 1:
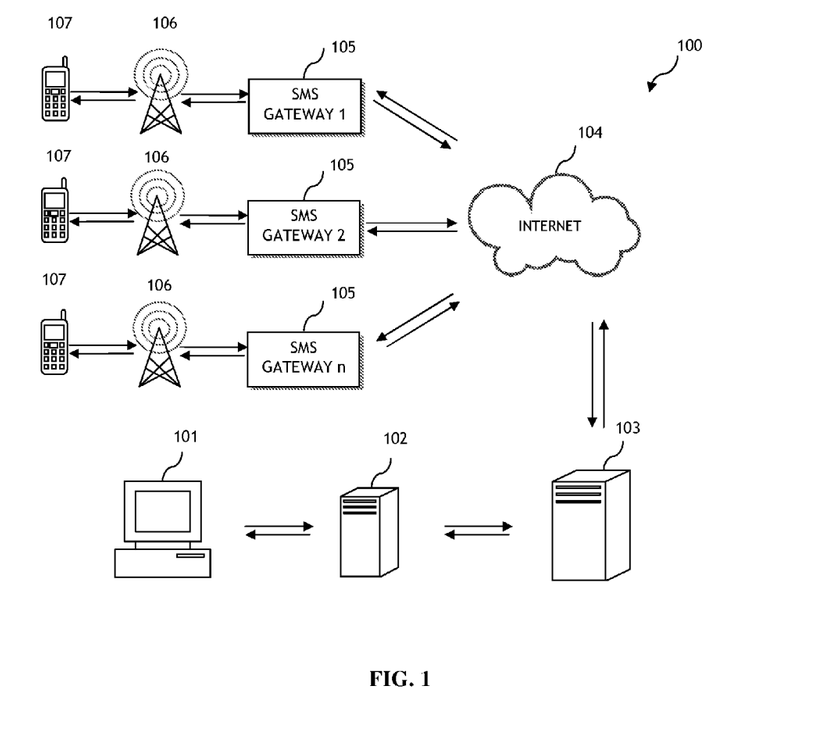
FIG. 1 illustrates a block diagram of the system wherein the SMS message is transmitted to the Service Provider selected from a list on the GUI component in a CRM application, depending upon the geographical location of the recipient Customer, in accordance with one embodiment of the invention.

FIG. 1 is a block diagram of system 100 wherein the SMS message is transmitted to the Service Provider selected from a list on the GUI component in a CRM application, depending upon the geographical location of the Customer. Referring now to FIG. 1, the system 100 may include at least one computing device and at least one messaging device 107 apart from other essential physical and software components, in order to implement the invented method. The system disclosed herein is comprised of a number of physical components of the system of the invention that are disclosed as below. In some embodiments the message originator i.e. the computing device 101 may include a CRM application capable of sending SMS messages through its GUI to its Customers across the globe. The CRM application connected to the internet 104 via Web Service 103 may be capable of sending and receiving messages by using HTTP protocol or XML. The CRM application embodying the present invention may be operational with numerous other general purpose or special purpose computing system environments or configurations. Examples of well known computing systems, environments, and/or configurations that may be suitable for implementation or use for the purpose of the invention includes, but not limited to personal computer, desktop or a server computer, laptops which may run on any of the following operating system such as Windows Server 2003, Windows XP, Windows Vista and the like. For accessing the CRM application over the web, internet browsers such as Internet Explorer and Firefox browsers etc. are supported. The computing device 101 may send a first message such as an SMS message during a marketing campaign or to deliver general information to its Customer in the form of an electronic message such as, for example, an HTML or XML message. The message may mention a Short Code to which the Customer may reply. This Short Code may belong to a local Service Provider that is configured with the CRM application transmitting the SMS message. Further, in another embodiment, the computing device 101 may be a remote system that automatically generates messages in response to a message or an enquiry from a Customer. In one embodiment, there may be more than one Service Providers configured with the CRM application that may facilitate the process of sending and receiving the SMS messages (through their SMS Gateways) to and from the Customers spread across various geographical locations of the world. In an embodiment, the CRM application residing in the computing device 101 may assign a unique identifier to each of the Service Providers configured with the application. The unique identifier provided, may be called as Service Providers ID (Identifier) with reference to the present invention. The application may provide communication through authorized SMS Gateways by saving their information such as name, username, password and Service Providers ID etc in a configuration file that is stored in the Application Database. This information may be retrieved during authentication process of a communication event such as transmission of an SMS message or during retrieval of an SMS messages sent by a Service Provider. Whenever an SMS message is sent from the computing device 101, it is first converted into XML format in order to facilitate the transmission process across various networks. The XML DTD, compatible with each of the Service Providers may be stored in the Application Database and the SMS message in the XML format is further converted into Service Provider compatible XML format by using XSLT structure provided by the SMS Service Provider. This SMS message in XML format may be transmitted by the Application Server 102 to the Web Services 103 for processing. The Web Service 103 may be any Web services application capable of allowing different applications from different sources to communicate with each other by using XML. Further, in an embodiment, the communication environment 100 may include more than one SMS Gateways 105 (e.g. up to 'n' as shown in FIG. 1) supported by the CRM Application running in the computing device 101. One or more of each of SMS Gateways 105 may be located in the different network/country catering to the Customers belonging to a specific geographical location. The SMS message may be sent to the corresponding SMS Gateway 105 (via internet 104) to which it was addressed. The computing device 101 may be configured to be compatible with SMS Gateways 105 and support the exchange of SMS messages between the both, through the internet 104. Most of the cellular networks handle SMS messages through a SMSC 106, which serves the primary function of storing, sending and receiving SMS messages to and from other networks. A SMSC 106 may handle a number of messaging devices 107 that are networked to it. Thus on receipt of an SMS message from the SMS Gateway 105, the message is further transmitted to the corresponding SMSC 106. The SMSC processes the message and finally delivers it to the messaging device 107 of the recipient Customer. The messaging device 107 may include any type of a number of mobile communications device, such as a cellular telephone, a personal digital assistant (PDA), or any other type of device represented by 107. Such messaging devices generally will be capable of sending and receiving SMS messages, although new technologies may incorporate SMS messaging capability into other devices that communicate using cellular networks. In an embodiment, the messaging device 107 may also send the SMS message via the same network using the Short Code mentioned by the organization/company. Since the Short Code is provided by the same local Service Provider, the messages will be charged as per the local SMS rates even though the message is sent to a different network/country. When the Customer transmits the SMS message using messaging device 107, it is first received by the SMSC 106 that further transmits it to the corresponding SMS Gateway 105. The Web Service 103 may either pull the message from the Service Provider or the message may be pushed by the Service Provider to the Web Service 103. The Web Service 103 provides Application Server 102 with the SMS messages received (either by push or pull mechanism) from messaging device 107 via Web Services Protocols. The messages thus received by the Application Server 102 are saved in the Application Database that can be accessed by the computing device 101 and subsequently sent to various departments depending upon the keyword and processed accordingly. The communication events mainly include SMS messages both sent and received. Each such communication generally includes two parties or users at each end. In context of the present invention, one user is referred to as a message-originating user or the CRM user who may be marketing personal or a customer service representative of an organization or institution, generally operating or interacting from the computing device 101. The user on the other end, who is the recipient of the message, is referred to as a Customer. The Customer receives the SMS message via cellular telephone 107. The Customer may be a potential future customer who has responded to a campaign by using the Short Code provided by the Service Provider. The terms, Customer and CRM user are used throughout the detailed description of the invention to enable an easy understanding of the invented method. As used herein, the term cellular shall be construed to include other types of wireless communication, and the use of the term wireless shall be construed to include cellular communication as well. Additionally, as used herein, the term SMS message and the term message shall be construed to mean SMS message of the type that are supported by the short message services offered by cellular Service Providers.

When an organization/institution desires to utilize the method disclosed herein, it has to tie up with a particular SMS Service Provider present in the country where the Customer is located. There can be any number of such SMS Gateways that can be configured with a CRM Application. In an embodiment of the present invention, a unique Service Provider ID may be assigned to Service Provider. This Service Provider ID may be used to identify the SMS Gateway to which out bound message has to be sent from the CRM application. The same Service Provider ID may be used to identify SMS Gateway when a message is to be pulled from the Web Server of a Service Provider.

FIG. 2 is an exemplary GUI component with a pull down menu, providing a list of available Service Providers, while transmitting an SMS from a CRM application. The CRM user may select the SMS Service Provider from the list 202 of available Service Providers configured with the CRM application. There may be any number of Service Providers configured to the CRM application wherein each Service Provider may belong to the network/country of the Customer. In the exemplary embodiment the list is shown in the form of a drop down menu. The SMS message text may be entered at the text entry section 203 where the SMS messages may be typed by using general input devices such a keyboard. The text message may include the Short Code to which the Customer may be requested to reply. After entering the SMS message text, the transfer of the SMS message may be initiated by selecting, for example, 'send' click button 204 on the GUI and clicking it with a mouse in a conventional manner. Upon clicking the 'send' click button 204, the method disclosed with respect to FIG. 3 is initiated wherein the SMS message is transmitted to the Service Provider that processes the SMS message and further transmits it to the suitable SMS Gateway in the network/country of the recipient Customer. When the Customer replies back using the Short Code provided in the received SMS message from the institution/organization, he may transmit the message to his local SMS Service Provider wherein he will be charged according to the local SMS rates whereby he will be able to send the message internationally through a local SMS Service Provider with local SMS message rates. It will be apparent to those skilled in the art that a different set of choices could be offered as well to the user of GUI component according to the invention depending on the application. When the list 202 is displayed, more or fewer choices, or a different set of choices, could be proposed as well to the user of a particular application.

FIG. 3 is an exemplary process flow illustrating one approach of processing SMS message, in response to selecting a Service Provider from the list in the GUI, in accordance with another aspect of the present invention. The method disclosed herein, may be implemented in the form of a Windows Service that may transmits SMS message to the Web Server of the Service Provider. The term windows service is well known in the art. Generally speaking, a windows service is a long-running executable that performs specific functions and which is designed not to require user intervention. Windows services can be configured to start when the operating system is booted and run in the background as long as Windows is running, or they can be started manually when required. The Windows Service embodying the present invention may be installed on the computing device on which the Application Server is installed. The processing steps conducted by the invented method during transmission of an SMS message will now be described in more details with reference to FIG. 3. An application configuration file may be maintained by the CRM application that may contain all the details needed to perform the intended function. These details may include Application Database Server details, Username, Password, Service Provider ID, Web Service ID etc. A configuration file may be a plain text file or a file stored in XML format. The configuration file may contain configuration parameters in tagged data format. Tagged data format is a descriptive term describing the configuration item and item's value. There may be multiple Web Services configured to process messages from different Service Providers. Thus each Web Service installed in the system, may have a unique Web Service ID and likewise, each Service Provider configured with each of such Web Service may have a unique Service Provider ID. The process initiates when an SMS message is composed and a Service Provider is selected from the list provided on the GUI at step 301 depending upon the geographical location of the Customer. After the 'send' click button 204 (FIG. 2) is selected from the GUI component, first of all the SMS message is converted into XML format at step 302. After this, at step 303, the Web Service details are fetched from the application configuration file stored in the Application Database. In the next step 304, the Service Provider configured with a particular Web Service is identified based on the Web Service ID which was retrieved in the previous step 303. In the next step 305, the Service Provider details are retrieved from the configuration file that is stored in the Application Database. Each Service Provider provides an SMS Gateway for its users to send/receive SMS messages. While configuring the Service Provider with a CRM application, unique login information, consisting of a unique user name and a unique password, is assigned to the organization/institution for the purpose of authorization and authentication of the user. This information about the username and password may be saved in another configuration file stored in the Application Database. Any number of Service Providers may be configured with the Web Service and their information may be saved in the configuration file. The details retrieved at step 303 may include the SMS Gateway URL (Uniform Resource Locator), gateway username, gateway password, service intervals (time interval at which the service in configured to run) etc. The SMS Gateway URL is used to determine the web address to which the SMS message has to be forwarded to by using the username and password given by Service Provider in order to access its services.

All SMS messages may be generally defined two or more levels of priority. In the exemplary embodiment, two type of priorities are defined that may include normal priority SMS messages and high priority SMS messages. The SMS messages with normal priority may be submitted to the outgoing queue. The high priority SMS messages may also be submitted to the outgoing queue but may be sent before all the normal priority messages in the queue. Thus at step 306 the priority of the SMS messages in the outbound messaging queue in checked. At step 307, another method may be called that may fetch and process normal priority SMS messages whereas, simultaneously at step 308, another method may be called that may fetch and process high priority SMS messages in the outbound messaging queue. In both the cases, the control may proceed to the next step 309, wherein the methods called, may perform similar functions after fetching the normal priority and high priority messages. After segregating the SMS messages based on their priorities, the next step is to convert the SMS messages to the Service Provider specific XML format that may be understood and compatible with the DTD rules defined by the Service Provider. The XSLT transformations are used to convert one form of XML format into another XML format and these XSLT style sheets may be compiled into DLL i.e. Dynamic Link Library. Creating such DLLs is quite well known in the art. These DLLs may be loaded and run later using standard classes known in the art and required function may be accomplished likewise. While configuring a new Service Provider, the Service Provider specific component (DLL) may be saved in the Application Database and the required XSLT transformation can be used whenever the appropriate DLL is called. At step 308, the Service Provider specific component (DLL), may be loaded. In the next step 310, the XML format of the SMS messages is converted into service provider specific XML structure by using XSLT transformations specified in the DLL. The control may then proceed to 311 where the XML format of the SMS message may be transmitted to the Service Provider that further forwards it to the corresponding SMS Gateway that belongs to the network/country of the intended recipient i.e. the Customer. The SMS Gateway, upon receiving the SMS message, transmits it to the corresponding Short Message Service Center (SMSC). The SMSC within the network further transmits the SMS message to the cellular device of the Customer and at the same time, the SMSC generates and issues a time stamped status report which may be sent back to the SMS Gateway via the internet. At step 312, this time stamped status report may be fetched by the SMS Web Service and saved in the Application Database. The status report may indicate the delivery time and status of the SMS message. At Step 313, the Application Database may be updated with the latest status reports for record and future use. After this step the method concludes.

Figure 4:
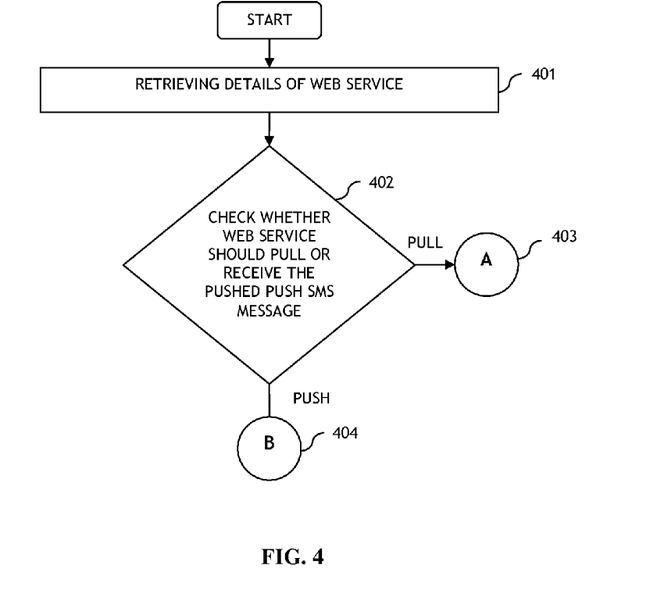
FIG. 4 is an exemplary process flow illustrating one approach of Action performed by the Web service, upon receipt of an SMS message from the Service Provider.

Referring now to FIG. 4, that illustrates an exemplary process flow of the actions performed by the Web Service upon receipt of an SMS message from the Service Provider. A detailed description of the process is provided in order to explain the 2-way SMS messaging system across various SMS Gateways and enable complete understanding of the invented method to a person skill in the art.

Upon receipt of an SMS message from the organization/ institution, the Customer (as explained above with reference to FIG. 1, FIG. 2 and FIG. 3) may choose to reply using Short Code via his Cellular Device 107 (FIG. 1). When the SMS message is transmitted from the cellular device, it may be first received by the SMSC that may further transmit it to the corresponding SMS Gateway in that region. In a typical client/server model, a client requests a service or information from a server, which then responds in transmitting information to the client. This is generally referred to as 'pull' technology, where client pulls the information from the server. For example, entry of a Uniform Resource Locator (URL) at a client device which is then dispatched to the server to retrieve the associated information is a pull transaction. One particular service feature available for communicating information is a 'push' feature (also known as a 'notification' feature or 'alert' feature). The 'push' technology generally refers to a means to transmit information to one or more devices without previous information to one or more devices without a user action. Thus, there is no explicit request from previous user before the server transmits its information and therefore push technology essentially includes server initiated transactions. The installed Web Service may either pull that SMS message from the Service Provider or the message may be pushed by the Service Provider to the Web Service.

The Web Service provides the Application Server with the SMS messages received (either by push or pull mechanism) from messaging device via Web Services Protocols. The messages thus received by the Application Server are saved in the Application Database that can be accessed by the computing device and subsequently sent to various departments depending upon the keyword and may be processed accordingly. The method to pull SMS message from the Service Provider may be integrated with the SMS Web Service. The Web Service after a specific time interval (generally in minutes) checks for the incoming SMS message received by the Service Provider.

In order to run the installed SMS Web Service, its details may be retrieved from the configuration file stored in the Application Database at step 401. The configuration file may store information such as Web Service ID, ID(Identifier) of the team to which the SMS message has to be routed, the date and time when the SMS Web Service was last run to pull SMS message or to receive push messages. It may further include information such as Identification code of the Service Provider i.e. Service Provider ID or the time interval and frequency at which the Web Service may be configured to run. The Short Code from where the message was received and the information about the URL of the Service Provider may also be included in the configuration file. It may further have information whether the SMS Web Service is configured to pull the SMS messages from the SMS Service Provider or to receive the SMS messages from the SMS Service Provider as and when the mobile originated/inbound messages arrive at the SMS Gateway. At step 402, when the method starts, it may check whether the Web Service is configured to Pull SMS message or it is configured to receive push SMS messages from the Service Provider. In case the Web Service is configured to Pull the SMS messages the control may proceed to step 403, denoted by letter 'A', where a method (explained with reference to FIG. 5) may be called that pulls the messages from the Service Provider whereas if the Push Service is configured, the control may proceed to step 404 denoted by letter 'B', where another method (explained with reference to FIG. 6) may be called to receive the pushed SMS messages from the Service provider.

Figure 5:
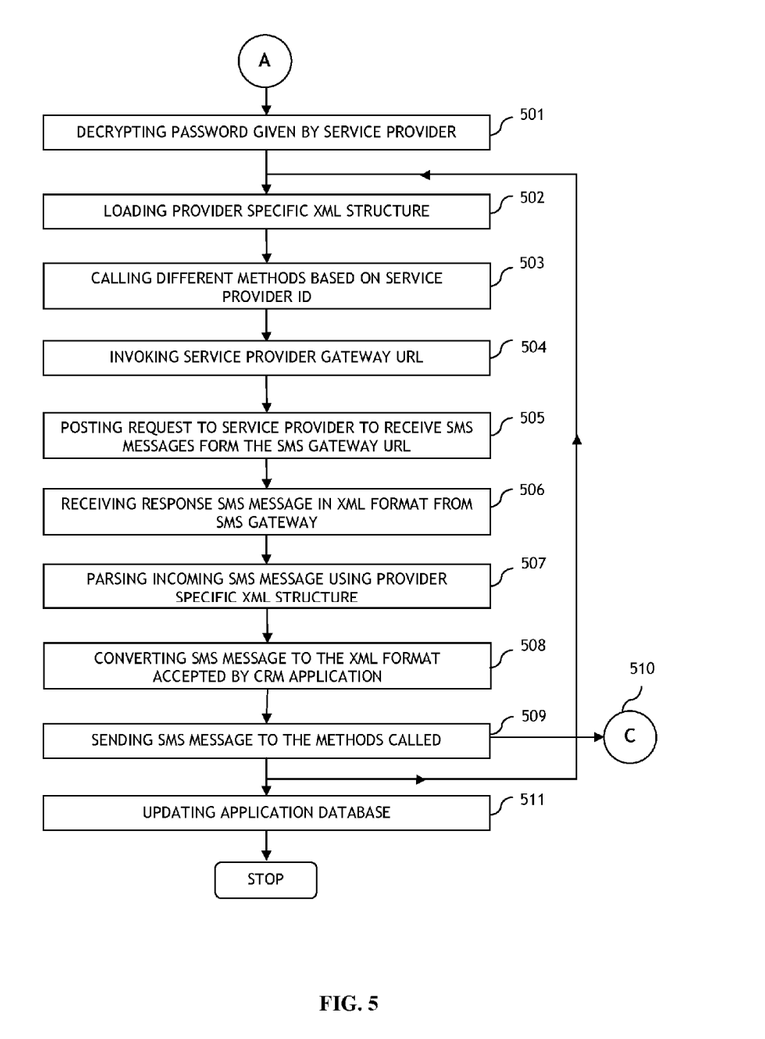
FIG. 5 is an exemplary process flow illustrating a method for pulling SMS messages from various Service Providers.

Referring now to FIG. 5, that illustrates an exemplary process flow for the method of pulling SMS messages from various Service Providers. Each Service Provider assigns unique login information consisting of a unique username and a unique password to its client in order to access its services and for the purpose of authentication. This username and password may be stored in the configuration file which may be further saved in the Application Database.

At step 501, this password, corresponding to the username provided by the Service Provider, may be decrypted in order to access its services. The SMS message received from the Service provider is generally in the XML format. Thus, in the next step 502, the Service Provider specific XML structure file may be loaded that may parse the incoming SMS message at a later stage when the SMS message is actually received from the Service Provider. At step 503, different methods may be called, based on specific Service Provider ID that may process the incoming SMS massages. At step 504, the Service Provider Gateway URL may be invoked through HTTP protocol via internet so that incoming SMS messages may be pulled from after authentication. At step 505, a request may be posted by the Web Service to receive SMS messages from the Service Provider Gateway URL. Upon such request and user authentication, the Service provider transmits the SMS messages (in XML format) to the CRM user at step 506. In the next step 507, the incoming SMS message may be parsed using the Service Provider specific XML structure loaded at step 502. At step 508, depending upon the Service Provider ID, the XML format of the received SMS message may be converted to XML format (by using the appropriate XSLT transformation) that may be understood by the CRM application. At step 509, the received SMS message in XML format may be sent to another method 510, denoted by letter 'C' (explained with reference to FIG. 7). At step 511, the Application Database may be updated with the date and time when the SMS Web Service was last run to Pull SMS messages or to receive the Pushed SMS messages from the Service Provider. After this step, the method may be repeated from step 501 to step 510, after a fixed time interval (defined in the configuration file) and frequency at which the Web Service is configured to run. After this step the method concludes.

Figure 6:
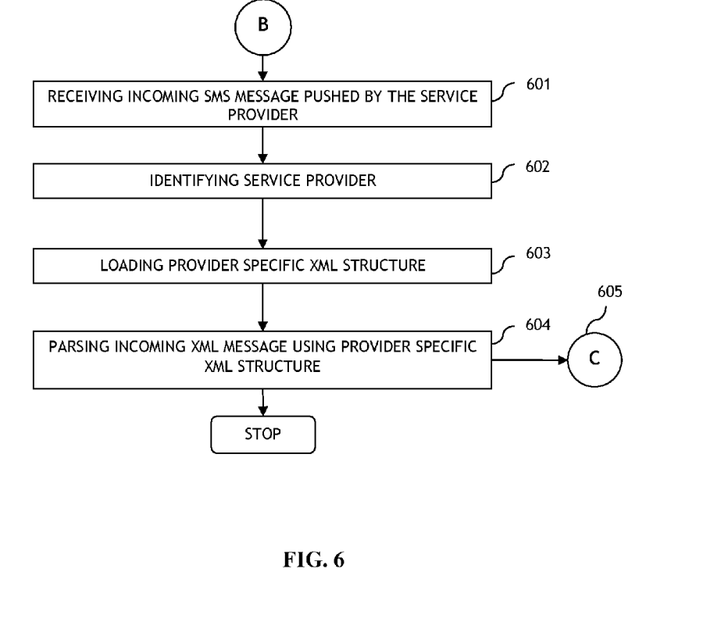
FIG. 6 is an exemplary process flow illustrating a method for receiving SMS messages Pushed by various Service Providers.

Referring now to FIG. 6, that illustrates an exemplary process flow of the method of receiving SMS messages Pushed by various Service Providers. As explained at step 404 (FIG. 4), the SMS message is pushed by the Service provider to the Web Service. The control may further proceed to step 610 (FIG. 6) where the incoming SMS message pushed by the Service Provider, may be received by the Web Service. The Service Provider that Pushed the SMS message is identified at step 602 and a corresponding Service Provider specific XML Structure is loaded at step 603. Since the SMS message received is coded in XML format specified by the Service Provider, thus at step 604, it is parsed using the loaded XML structure. After parsing the message, it is sent to other methods at step 605, denoted by letter 'C' (as explained with reference to FIG. 7). After this step the method concludes.

Figure 7:
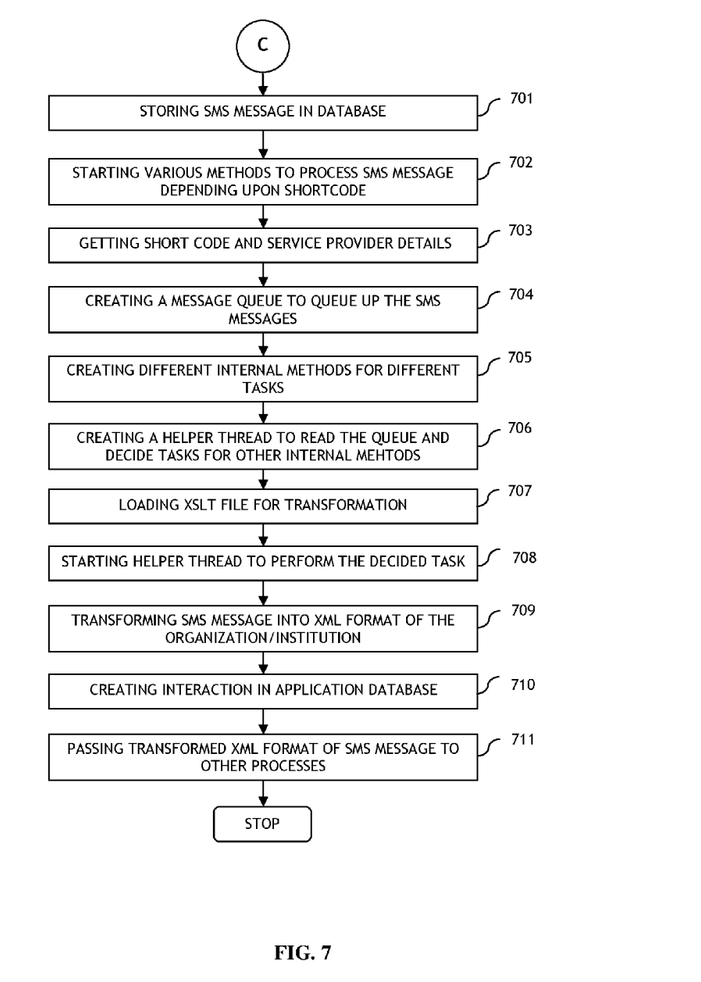
FIG. 7 is an exemplary process flow illustrating a method for processing the SMS message Pulled by the Web Service or Pushed by the Service Provider to the Web Service.

Referring now to FIG. 7, that illustrates an exemplary process flow for the method of processing the SMS message Pulled by the Web Service or Pushed by the Service Provider to the Web Service. The SMS message Pulled by the Web Service (as explained in FIG. 5) and the SMS message Pushed by the Service provider (as explained in FIG. 6), may be received by the method explained with reference to FIG. 7. Before starting the method, all of the retrieved SMS messages may be saved in the Application Database as backup at step 701. If the Application Database is not accessible at some point of time, the method of pulling SMS messages from various Service Providers as explained in FIG. 5 is temporarily stopped until the Application Database is accessible. In the case where SMS messages are pushed by the Service providers, the retrieved SMS messages may be stored as a physical file onto the hard disk of the computing device 101 (FIG. 1). If the SMS message is stored successfully in the Application Database as backup, the actual processing of the SMS messages may be done. In the next step 702, the method processes the SMS message based on the keyword present in the SMS message text. There may be multiple SMS Web Services configured for different SMS Short/Long Code communicating with this method. For every SMS Short Code from where the SMS messages are received, a separate internal process may be created so that each of these internal processes may have their own methods of processing the SMS messages depending upon the keyword present in the SMS message text. As a result, all the SMS messages from different SMS Short codes may be processed in parallel. At step 703, each process may perform similar steps from 703 to 712. At step 703, the details about the Short Code from where the messages have been received and details about the Service Provider (Service Provider ID) may be retrieved from the Application Database. At step 704, a message queue may be created to queue up all of the SMS messages in the queue defined in the respective Short Code process. At step 705, various internal methods may be created that may process the SMS messages based on the keyword present inside the message text. At step 706, a helper thread may be created that may read the SMS message queue. The helper thread may be configured to decide and assign different tasks to the internal methods depending upon the keyword. At step 707, the XSLT transformation file may be loaded for transforming the received XML format of the SMS message to the XML format compatible with the organization/institution's XML structure. At step 708, the helper thread created at step 706, may be initiated to perform the decided tasks. As and when the SMS message queue is filled up with the incoming SMS messages, at step 709, these messages may be extracted and transformed into XML format compatible with the XML format stored in the Application Database. Whenever a message is sent, an interaction may be created and this message may be added to the interaction whereas upon receiving reply SMS message from the customer, it may be added to the same interaction and the message may be associated with the contact that has sent the SMS message. At step 710, an interaction may be created and saved in the Application Database. Finally at step 711, the transformed SMS messages may be forwarded to the other methods for further processing. After this the method concludes.

It will be appreciated that more or fewer processes may be incorporated into the methods illustrated in FIGS. 3, 4, 5, 6 and 7 without departing from the scope of the invention and that no particular order is implied by the arrangement of blocks shown and described herein. It should be noted that the algorithms of the system disclosed herein, illustrated with the use flow charts, are multithreaded event driven algorithms. Therefore, the system is capable of simultaneously sending and receiving a plurality of messages to support requests from one or more users, as the case may be.

Figure 8:
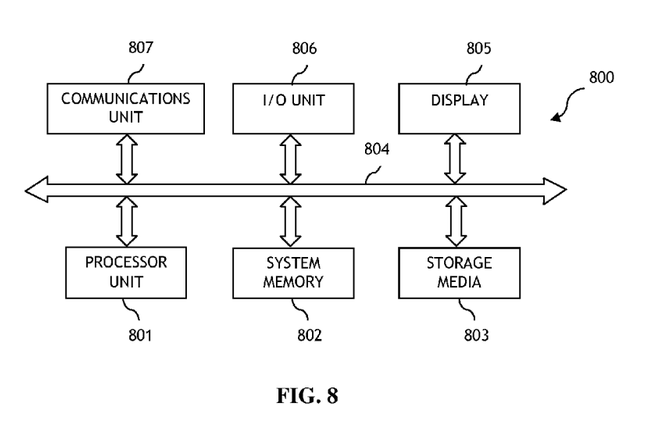
FIG. 8 is a block diagram illustrating one example of a suitable computing environment or operating environment on which the disclosed method may be implemented.

The following description FIG. 8 is intended to provide an overview of computer hardware and other operating components suitable for implementing the invention but is not intended to limit the applicable environments. The computing system environment described below is only one example of a suitable computing environment and is not intended to suggest any limitation as to the scope of use or functionality of the invention. Neither should the computing system environment be interpreted as having any dependency or requirement relating to any one nor a combination of components illustrated in the exemplary operating environment. The computing environment includes a general-purpose computing device in the form of a Data Processing System 800, which may be any of computing devices. While the present invention is described hereinafter with particular reference to the system block diagram of FIG. 8 it is to be understood at the outset of the description which follows, it is contemplated that the apparatus and methods in accordance with the present invention may be used with other hardware configurations as well. For example, the system processor could be an Intel Pentium IV at the Server side and Pentium III at the Client's side.

The exemplary CRM application is operational with numerous other general purpose or special purpose computing system environments or configurations. Examples of well known computing systems, environments, and/or configurations that may be suitable for implementation or use include, but are not limited to personal computer, desktop or a server computer, laptops which run on any one of the following operating system Windows Server 2003, Windows XP, Windows Vista. For accessing the CRM application over the web Internet Explorer and Firefox browsers are supported.

Turning now to FIG. 8, a diagram of a design system is depicted in accordance with an illustrative embodiment. In this illustrative example, Data Processing System 800 includes Communications Fabric 804, provides communications between Processor Unit 801, System Memory 802, Storage Media 803, Communications Unit 807, I/O unit 806, and display 805.

Processor Unit 801 serves to execute instructions for software that may be loaded into System Memory 802. Processor unit 801 may be a set of one or more processors or may be a multi-processor core, depending on the particular implementation. The Processing Unit 801 sends various data values, instructions, and information to all the devices and components inside Data Processing System 800 as well as the different peripherals and devices attached.

The System Memory 802 is the place where the computer holds current programs and data that are in use. The System Memory 802 can be divided into two essential types: RAM and ROM. RAM, or Random Access Memory is 'volatile' which means that it only holds data while power is present. RAM changes constantly as the system operate, providing the storage for all data required by the operating system and software. ROM or Read Only Memory is always found on motherboards, but is increasingly found on graphics cards and some other expansion cards and peripherals. Instructions for the operating system, the object-oriented programming system, and applications or programs are located on Storage Media 803. These instructions may be loaded into System Memory 802 for execution by Processor Unit 801. The processes of the different embodiments may be performed by Processor Unit 801 using computer implemented instructions, which may be located in the System Memory 802.

Similarly in network environment, program modules depicted relative to Data Processing System 800, or portions thereof, may be stored in a Remote Memory Storage Devices. Various modules and techniques may be described herein in the general context of computer-executable instructions, such as program modules, executed by one or more computers or other devices. An implementation of these modules and techniques may be stored on or transmitted across some form of computer readable media. Storage Media 803 may include removable/non-removable, volatile/non-volatile computer storage media depending upon the particular implementation. For example, Storage Media 803 may be, a hard drive for reading from and writing to a non-removable, non-volatile magnetic media (not shown), magnetic disk drive for reading from and writing to removable, non-volatile magnetic disk (e.g. 'floppy disk') and optical disk drive for reading from and/or writing to a removable, non-volatile optical disk drive such as CD-ROM, DVD-ROM, a flash memory, or some combination of the above. The hard disk drive, magnetic disk drive and optical disk drive are each connected to the system bus through one or more data media interface.

Communications Unit 807, in these examples, provides for communications with other data processing systems or devices. In these examples, Communications Unit 807 is a network interface card. I/O Unit 806 allows for input and output of data with other devices that may be connected to Data Processing System 800. For example, I/O Unit 806 may provide a connection for user input though a keyboard and mouse. Further, I/O Unit 806 may send output to a printer. Display 805 provides a mechanism to display information to a user. Data Processing System 800 can be connected to other remote computing devices via network connections constituting a computer network. Remote computing device for example can be a desktop or a server computer, laptops. Remote computing device may include many or all of the elements and features described herein relative to Data Processing System 800. Alternatively, Data Processing System 800 can operate in a non-networked environment as well. Networks connections between the Data Processing System 800 and remote computers may be a local area network (LAN) and a wide area network (WAN). A LAN covers a small geographic area, like a home, office, or building whereas a WAN covers a relatively broad geographic area (i.e. one city to another and one country to another country). In a LAN environment, Data Processing System 800 is connected to local network of computers via network adapter. When implemented in a WAN network environment, Data Processing System 800 includes modem or other means for establishing communications over network. Modem can be internal or external to computer; can be connected to system bus via I/O Unit 806 or other appropriate mechanisms. In some illustrative examples, the Data Processing System 800 may be a Personal Digital Assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main System Memory 802 or cache memory. A Processing Unit may include one or more processors or CPUs. The depicted examples in FIG. 8 and above-described examples are not meant to imply architectural limitations. For example, Data Processing System 800 also may be a tablet computer, laptop computer, or telephone device in addition to taking the form of a PDA. In operation, Data Processing System 800 executes computer executable instructions such as those illustrated in FIG. 3, FIG. 4, FIG. 5, FIG. 6 and FIG. 7. The order of execution or performance of the methods illustrated and described herein is not essential, unless otherwise specified. That is, elements of the methods may be performed in any order and that the methods may include more or less elements than those disclosed herein. FIG. 8 is intended as an example, and not as an architectural limitation for different embodiments. The hardware in FIG. 8 may vary depending on the implementation. In addition, the processes of the illustrative embodiments may be applied to a multiprocessor data processing system.

The description of the illustrative embodiments have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Those who are skilled in this art will recognize that the system disclosed herein is comprised of a variety of physical components and these components can be programmed to operate according to event driven algorithms. It is to be understood, however, that the invention is not limited to the specific features shown or described, and that the means and construction shown or described comprise only the preferred forms of putting the invention into effect. Additionally, while this invention is described in terms of being used for sending SMS messages and text messages between wireless communication networks, it will be readily apparent to those skilled in the art that the invention can be adapted to other uses as well. Therefore, the invention should not be construed as being solely limited to use in SMS messaging, and is therefore, claimed in any of its forms or modifications within the legitimate and valid scope of the appended claims.

Industrial Applicability

The invented method disclosed herein, provides the flexibility to configure multiple SMS Gateways and Service providers in a CRM application, so that while sending an SMS message, a user may choose the SMS Gateway or Service Provider based on the Customer's geographical location. This results in cost reduction to the organization, as well as the Customers who receive and respond to the SMS message via same SMS Gateway that belongs to their own network/country. A CRM user may select an appropriate SMS Gateway for Campaigns as well as for normal communication with the Customer, based on the Customer's geographical location. Choosing an SMS Gateway which is regional or country specific will not consider SMS messages sent as international, and will be charged at local rates that helps in reducing the cost of bulk SMS message to Customers spread across various geographic locations of the world. As most of the organizations/institutions have various offices across the globe and cater to global customers, it is very critical to help organizations using a software application, including a CRM application, reach and interact with its Customers through SMS, irrespective of their location, at the lowest rate. The present invention helps bring in better Return On Investment (ROI) on communication and Campaigns.

The invention claimed is:

1. An short message service (SMS) message integration method for customer relationship management (CRM) applications, the method comprising the steps of:
   selecting an SMS service provider from a list presented by the CRM application;
   retrieving from a configuration file stored in a database of the CRM application an identification of a Web service listed in a directory accessible according to universal description, discovery and integration (UDDI) and described according to Web services definition language (WSDL) associated with the SMS service provider;
   converting an SMS message to an extensible markup language (XML) format accepted by the Web service; and,
   transmitting the XML formatted SMS message to said Web service.

2. The method according to claim 1 wherein the list comprises
   a plurality of SMS service providers
   each assigned a unique service provider identifier identifying a particular geographical location.

3. The method according to claim 1, wherein the configuration file references an application database in communication with said CRM application and login information associated with an end user of the CRM application sufficient to enable access to the Web service.

4. The method according to claim 1, wherein the configuration file additional specifies a Uniform Resource Locator (URL) of an SMS gateway provided by said SMS service provider, login information associated with an end user of the CRM application sufficient to enable access to the SMS gateway and a time interval during which the Web service is configured to run.

5. The method according to claim 1, further comprising checking different priorities of different SMS messages and retrieving an SMS message from amongst the different SMS messages based upon the priority, wherein said different priorities are priorities selected from the group consisting of a normal priority to send SMS messages to an outbound queue and a high priority to send SMS messages before all normal priority SMS messages in said outbound queue.

6. The method according to claim 1, wherein the SMS service provider receives a time stamped status report from a SMS Center in communication with SMS gateway provided by the SMS provider.

7. The method according to claim 6, wherein said status report further comprises a delivery time at which said SMS message is actually delivered to a designated recipient and a status of said SMS message.

8. A system for transmitting a short message service (SMS) message to an SMS service provider selected from a list presented by a graphical user interface (GUI) component in a customer relationship management (CRM) application, the system comprising:
   at least one computing device running a CRM application;
      an application server executing in a computing device;
      said application server further comprising a computer having a machine readable storage, having stored there on one or more computer programs comprising a plurality of code sections executable by a machine for selecting an SMS service provider from a list presented by the CRM application;
   retrieving from a configuration file stored in database of the CRM application an identification of a Web service listed in a directory accessible according to universal description, discovery and integration (UDDI) and described according to Web services definition language (WSDL) associated with the SMS service provider;
   converting an SMS message to an extensible markup language (XML) format accepted by the Web service; and,
   transmitting the XML formatted SMS message to said Web service.

* * * * *